US010743717B2

(12) United States Patent
Furler

(10) Patent No.: US 10,743,717 B2
(45) Date of Patent: Aug. 18, 2020

(54) SINK AND CABINET GUARDS

(71) Applicant: Garth Furler, The Dalles, OR (US)

(72) Inventor: Garth Furler, The Dalles, OR (US)

( * ) Notice: Subject to any disclaimer, the term of this patent is extended or adjusted under 35 U.S.C. 154(b) by 0 days.

(21) Appl. No.: 16/017,843

(22) Filed: Jun. 25, 2018

(65) Prior Publication Data
US 2019/0387929 A1    Dec. 26, 2019

(51) Int. Cl.
*A47J 47/20* (2019.01)
*A47L 17/04* (2006.01)
*A46B 1/00* (2006.01)

(52) U.S. Cl.
CPC .............. *A47J 47/20* (2013.01); *A47L 17/04* (2013.01); *A46B 1/00* (2013.01)

(58) Field of Classification Search
CPC ........... A47J 47/20; E03C 1/181; E03C 1/186
See application file for complete search history.

(56) References Cited

U.S. PATENT DOCUMENTS

| | | | | |
|---|---|---|---|---|
| 526,390 A | * | 9/1894 | Glauber | E03C 1/186 4/654 |
| 4,480,343 A | * | 11/1984 | Drach | A47L 19/00 108/13 |
| 6,371,470 B1 | * | 4/2002 | Ward | A47J 47/005 269/13 |
| 8,684,192 B1 | * | 4/2014 | Margolin | A47J 47/20 211/41.3 |
| 2007/0090063 A1 | * | 4/2007 | Schmidt | A47L 19/04 211/41.3 |
| 2009/0139023 A1 | * | 6/2009 | Talerico | E03C 1/186 4/654 |
| 2018/0179744 A1 | * | 6/2018 | Zver | E03C 1/22 |
| 2018/0296062 A1 | * | 10/2018 | Jolly | A46B 1/00 |

* cited by examiner

*Primary Examiner* — J C Jacyna
(74) *Attorney, Agent, or Firm* — Mohr Intellectual Property Low Solutions, PC

(57) ABSTRACT

A method, system, apparatus, or device to protect a sink or a cabinet. An apparatus may include a substrate, a guard wall, a first fastening wall, and a second fastening wall. The substrate may extend along a plane and include a top surface and a bottom surface. The guard wall may extend along at least part of a perimeter of the substrate. The first fastening wall may extend downwardly from a first edge of the substrate. The second fastening wall may extend downwardly from a second edge of the substrate.

18 Claims, 7 Drawing Sheets

SINK AND CABINET GUARDS

BACKGROUND

In many homes and businesses, a significant investment is made into cabinets, such as wood or wood faced cabinets. In kitchens, laundry rooms, and other rooms with sinks, the cabinets may include a cabinet top with a sink to wash items, fill water containers, and otherwise access water. As individuals use the sinks, water and other substances may splash from the sink and fall to the face of the cabinets along the cabinet tops and/or below the sink. The splashes may discolor, warp or otherwise damage the cabinets. Additionally, as items are placed in the sink and/or taken out of the sink, the items may hit and damage the sink or the cabinets.

SUMMARY

A method, system, apparatus, or device to protect a sink or a cabinet. In one example, the apparatus may include a substrate that extends along a plane and includes a top surface and a bottom surface. The apparatus may include a guard wall that extends along at least part of a perimeter of the substrate. The apparatus may include a first fastening wall that extends downwardly from a first edge of the substrate. The apparatus may include a second fastening wall that extends downwardly from a second edge of the substrate.

BRIEF DESCRIPTION OF THE DRAWINGS

The present description will be understood more fully from the detailed description given below and from the accompanying drawings of various embodiments of the present embodiment, which is not to be taken to limit the present embodiment to the specific embodiments but are for explanation and understanding.

DETAILED DESCRIPTION

Figure 1A:
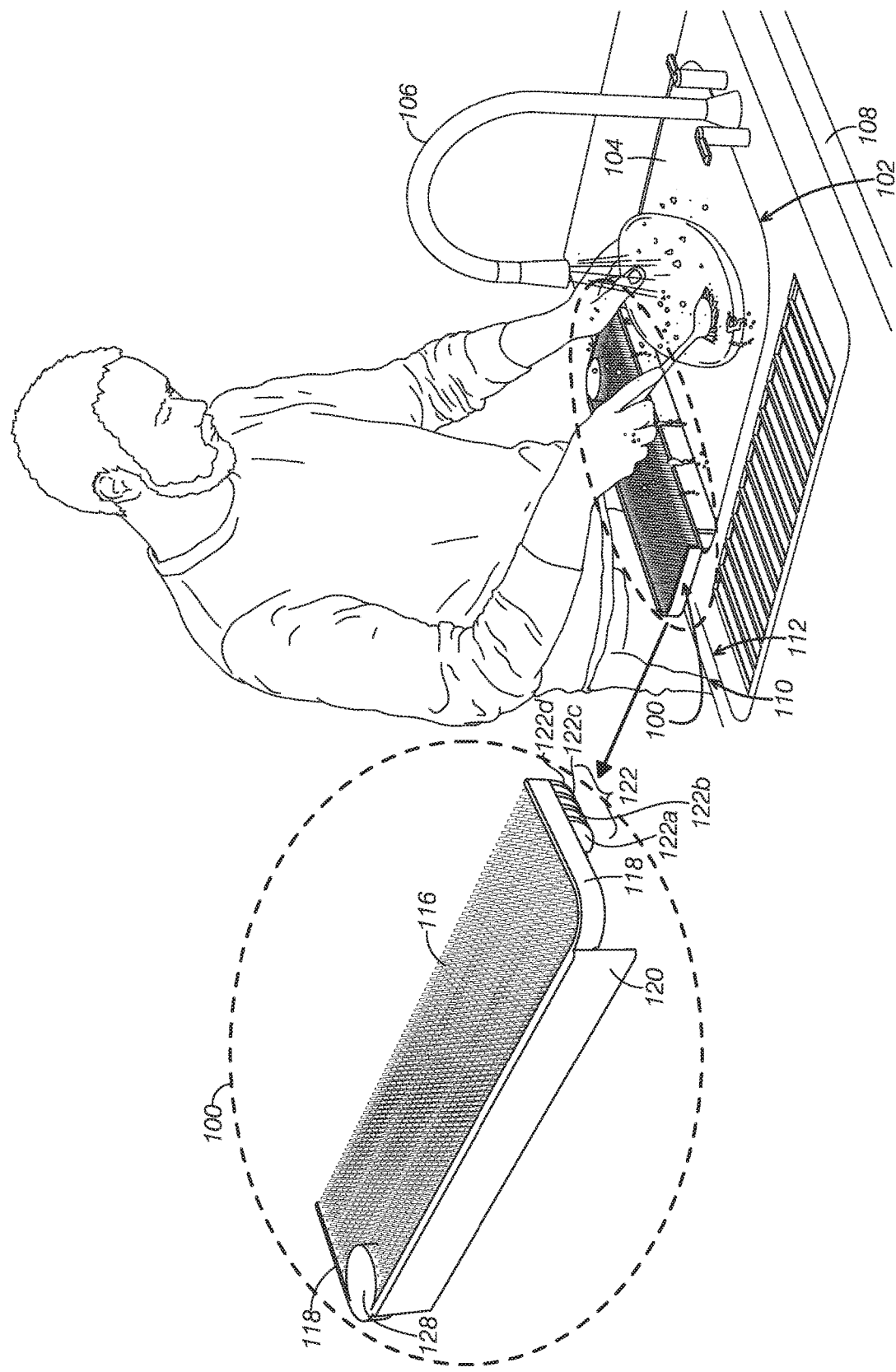
FIG. 1A illustrates a guard attached to a sink, according to an embodiment.

The disclosed sink and cabinets guards will become better understood through a review of the following detailed description in conjunction with the figures. The detailed description and figures provide merely examples of the various embodiments described herein. Those skilled in the art will understand that the disclosed examples may be varied, modified, and altered and not depart from the scope of the embodiments described herein. Many variations are contemplated for different applications and design considerations; however, for the sake of brevity, the contemplated variations may not be individually described in the following detailed description.

Throughout the following detailed description, examples of various disclosed sink and cabinets guards are provided. Related features in the examples may be identical, similar, or dissimilar in different examples. For the sake of brevity, related features will not be redundantly explained in multiple examples. Instead, the use of related feature names will cue the reader that the feature with a related feature name may be similar to the related feature in an example explained previously. Features specific to a given example will be described in that particular example. The reader is to understand that a given feature need not be the same or similar to the specific portrayal of a related feature in any given figure or example.

Homes and businesses often include multiple rooms with cabinets. The cabinets may serve as a place to store objects. The cabinets may also serve as an aesthetically pleasing decoration for the homes and businesses. The cabinets may represent a costly investment, especially when the cabinets includes wood material.

For some rooms, a sink may be integrated into the cabinets or attached to the cabinets. Individuals may use the sinks to wash items and/or get water from a faucet of the sink. For example, an individual may use a sink in a bathroom or laundry room to wash his/her hands. In another example, an individual may partially fill the sink with water in a kitchen and use the water to clean objects, such a dishes, pots, pans, cups, silverware, and so forth.

During use of the sink, water, food, or other substances may splash from the sink and fall onto the cabinets. The splashes may discolor, warp or otherwise damage the face of the cabinet under the sink. Additionally, as items are placed into the sink, used in the sink, and/or taken out of the sink, the items may hit the sink and/or the cabinets. When the items strike the sink and/or cabinet, the strike may damage the sink and/or cabinets. For example, as an individual uses a sink in a kitchen to wash pots and pans, the individual may accidentally strike the pots and pans against a side or edge of the sink or cabinets. As the pots and pans strike the sink or cabinets, the strike may chip, bend, or scratch the sink or cabinets, reducing the value and aesthetic appeal of the sink or cabinets.

Implementations of the disclosure address the above-mentioned deficiencies and other deficiencies by providing a method, system, device, or apparatus to guard and protect the sink and/or cabinets during use. The guard may attach to the sink or cabinets and provide a protective substrate that shields the sink and/or cabinets from liquids, strikes, and other damage. In one embodiment, the guard may include a substrate that extends along a plane that attaches to a surface of the sink or cabinets. The substrate may include one or more guard walls that extend upward from the plane of the substrate. The guard wall(s) may provide a barrier to catch liquids, such as water that may accidentally leave the sink, such as water that splashes from the sink as dishes are being washed. The substrate may include a channel to direct the liquids back into the sink. The substrate may also include one or more fastening walls that extend downward from the plane of the substrate. The fastening wall(s) may hang over an edge or lip of the sink or cabinets to reduce or eliminate a movement of the substrate, thereby keeping the guard in place during use.

FIG. 1A illustrates a guard 100 attached to a sink 102, according to an embodiment. The sink 102 may be a fixed basin with side walls 104, a bottom wall, a water supply 106, and a drain. The side walls 104 and the bottom wall may form a closed container that may hold water that is supplied by the water supply 106. The water supply 106 may be a faucet that attaches to a water pipe. When the faucet is in an open position, the faucet may allow water to flowing into the sink 102. When the faucet is in a closed position, the faucet may stop the water from flow into the sink 102.

The side walls 104 and the bottom wall may form a water-tight bowl that may hold water and other objects within the bowl. The drain may be located along a side wall 104 or the bottom wall. When the drain is closed, the sink 102 may hold the liquids and other objects within the bowl. When the drain is open, the drain may allow the liquids and other substances to drain from the bowl into a conduit leading away from the sink 102. For example, the drain may be connected to a pipe connecting to a sewage system or a water recycling system.

In one embodiment, the sink 102 may be attached to a cabinet 108. For example, the cabinet 108 may include a lip 110 with an opening that extends around a perimeter of the sink 102. In one example, the lip 110 may be part of a countertop of the cabinet 108. In another example, the cabinet 108 may refer to a single a cupboard, bureau, bookcase, chest of drawers, sideboard, dresser, credenza, highboy, tallboy, wardrobe, chiffonier, armoiré, wall unit, countertop, and so forth. In another example, the cabinet 108 may refer to multiple cupboards, bureaus, bookcases, chests of drawers, sideboards, dressers, credenzas, highboys, tallboys, wardrobes, chiffoniers, armoirés, wall units, countertops, and so forth. In one example, the lip 110 may be a portion of the cabinet that extends around an edge of an opening that is shaped to receive the sink 102. The sink 102 may include a rim 112 that extends over at least a portion of the lip 110 of the cabinet 108. For example, the rim 112 may be an outer perimeter edge of the sink 102 that extends perpendicularly from one or more side walls 104 of the sink 102. The rim 112 may be attached to the lip 110 of the sink 102 so that the lip 110 of the sink 102 may rest on top of the rim 112 and at least a portion of the rim 112 overlaps the lip 110. In one example, the rim 112 may be attached to the lip 110 with adhesive, a fastener, caulk, and so forth. In another example, the rim 112 may rest on top of the lip 110 and remain in place via gravity and friction.

In another embodiment, the sink 102 may be integrated into the cabinet 108. The rim 112 may be integrated into the lip 110 of the cabinet such that the rim 112 is not exposed to a view of the user. In one example, the rim 112 may be mounted to a bottom side of the lip 110 such that the sink appears to be integrated into the cabinet, also referred to as an under-mounted sink.

The guard 100 may be configured to attach to the lip 110 and/or the rim 112. In one embodiment, the guard 100 may include a substrate 116. The substrate 116 may be a planar or flat substrate that may attach or rest on the lip 110 and/or the rim 112. For example, the lip 110 and/or the rim 112 may form a flat or horizontal plane. In another example, the lip 110 and/or the rim 112 may form a substantially flat or substantially horizontal plane, where the lip 110 and the rim 112 are slightly uneven with each other (such as one extending above the other by 1 mm-25 mm). The substrate 116 may rest on the flat or horizontal plane and extend along another flat or horizontal plane that runs parallel to the flat or horizontal plane of the lip 110 and/or the rim 112. In one example, the substrate 116 may attach to the lip 110 and/or the rim 112 by a fastener. The fastener may be a suction cup, adhesive, screws, magnets, and so forth. In another example, the substrate 116 may attach to the lip 110 and/or the rim 112 by a friction fit and/or gravity.

The substrate 116 may be made of a material that may protect or shield the sink 102 and/or cabinet 108 from liquids, strikes, and other damage. In one example, the substrate 116 may be a material such as plastic, rubber, polyurethane, and so forth that may absorb or disperse strikes from objects and provide a protective cushion against the objects damaging the sink 102 and/or cabinet 108. The plastic, rubber, polyurethane, or other material may be a relatively soft and non-abrasive material that may not scratch or mark the sink 102 and/or cabinet 108 as the guard 100 attaches to or rests on the lip 110 and/or the rim 112. In another example, the substrate may be metal that is rust-resistant and may be a durable material to withstand multiple strikes without damage.

The substrate may include one or more guard walls 118 that extend upward from the plane of the substrate 116. In one example, the guard walls 118 may extend perpendicularly from the plane of the substrate 116. In one embodiment, the guard walls 118 may extend along multiple sides or edges of the substrate. For example, the guard walls may extend along each side of the substrate 116 and along a back of the substrate 116 to provide a barrier to catch liquids, such as water that may accidentally splash from the sink. The front of the substrate may not include a guard wall 118 so that liquids and/or other substances caught by the guard walls 118 and the substrate 116 may flow back into the sink 102. The front of the substrate may be the portion of the substrate facing the sink 102. In one example, the substrate 116 may include a channel to direct the liquids and/or substances back into the sink 102. In another example, the substrate 116 may gradually taper downwardly toward the sink to direct the liquids and/or other substances toward the sink 102.

The substrate may also include a back fastening wall 120 and a front fastening wall 122. In one embodiment, the back fastening wall 120 may extend from a back side of the substrate 116 downwardly toward the ground or a bottom of the sink 102 and/or the cabinet 108. For example, the back fastening wall 120 may be coplanar to a guard wall 118 at the back of the guard 100 and perpendicular to the plane of the substrate 116. The back fastening wall 120 may extend below the plane of the substrate 116. In another embodiment, the back fastening wall 120 may be attached to or part of the guard wall 118 at the back of the guard 100. For example, the back fastening wall 120 may be a portion of the guard wall 118 at the back of the guard 100 that continues to extend downwardly toward the ground or the bottom of the sink 102 and/or the cabinets 108. In one example, when the guard 100 is attached to the lip 110 and/or rim 112, the back fastening wall 120 may hang over an outer edge of the lip 110 of the cabinet 108. The back fastening wall 120 may reduce or eliminate a movement of the guard 100 and keep the guard 100 in a fixed and stationary position.

In another embodiment, the front fastening wall 122 may extend from a bottom surface approximate a front side or portion of the substrate 116 downwardly toward the ground or a bottom of the sink 102 and/or the cabinet 108. For example, the front fastening wall 122 may extend perpendicularly from the plane of the substrate 116 and extend below the plane of the substrate 116. In another embodiment, the front fastening wall 120 may be attached to or be part of the substrate 116 at the front of the guard 100. As discussed above, guard 100 may include an open face at a front of the guard 100 to allow liquids and/or other substances to be caught by the guard walls 118 and be channeled back into the sink 102. The front fastening wall 122 may extend downwardly or perpendicularly from the substrate 116 to aid in fastening the guard 100 to the lip 110 and/or rim 112 while not obstructing the liquid and other substances from being channeled back into the sink 102.

In one example, when the guard 100 is attached to the lip 110 and/or the rim 112, the back fastening wall 120 may hang over an outer edge of lip 110 of the cabinet 108. In another example, when the guard 100 is attached to the lip 110 and/or the rim 112, the front fastening wall 122 may hang over an inner edge of the rim 112. The front fastening wall may include multiple sub-walls 122a-d that may be adjusted to accommodate sinks 102 and cabinets 108 with various sizes of lips 110 and rims 112, respectively.

The back fastening wall 120 may extend over the outer edge of the lip 110 and the front fastening wall 122 may extend over the inner edge of the rim 112, the guard 100 may conform around a portion of the cabinet 108 and the sink 102 to reduce or eliminate a movement of the guard 100 and keep the guard 100 in a fixed and stationary position. In one example, the guard 100 may be removably attached to the sink 102 and the cabinet 108 such that when the guard 100 is attached to the sink 102 and the cabinet 108 the guard is fixed and stationary and when a user desires to remove the guard 100 from the sink 102 and cabinet 108, the guard may be easily removed. In one example, when the back fastening wall 120 extends of the lip 110 and the front fastening wall 122 extends over the rim 112, they may form a friction fit with the lip 110 and the rim 122.

Figure 1B:
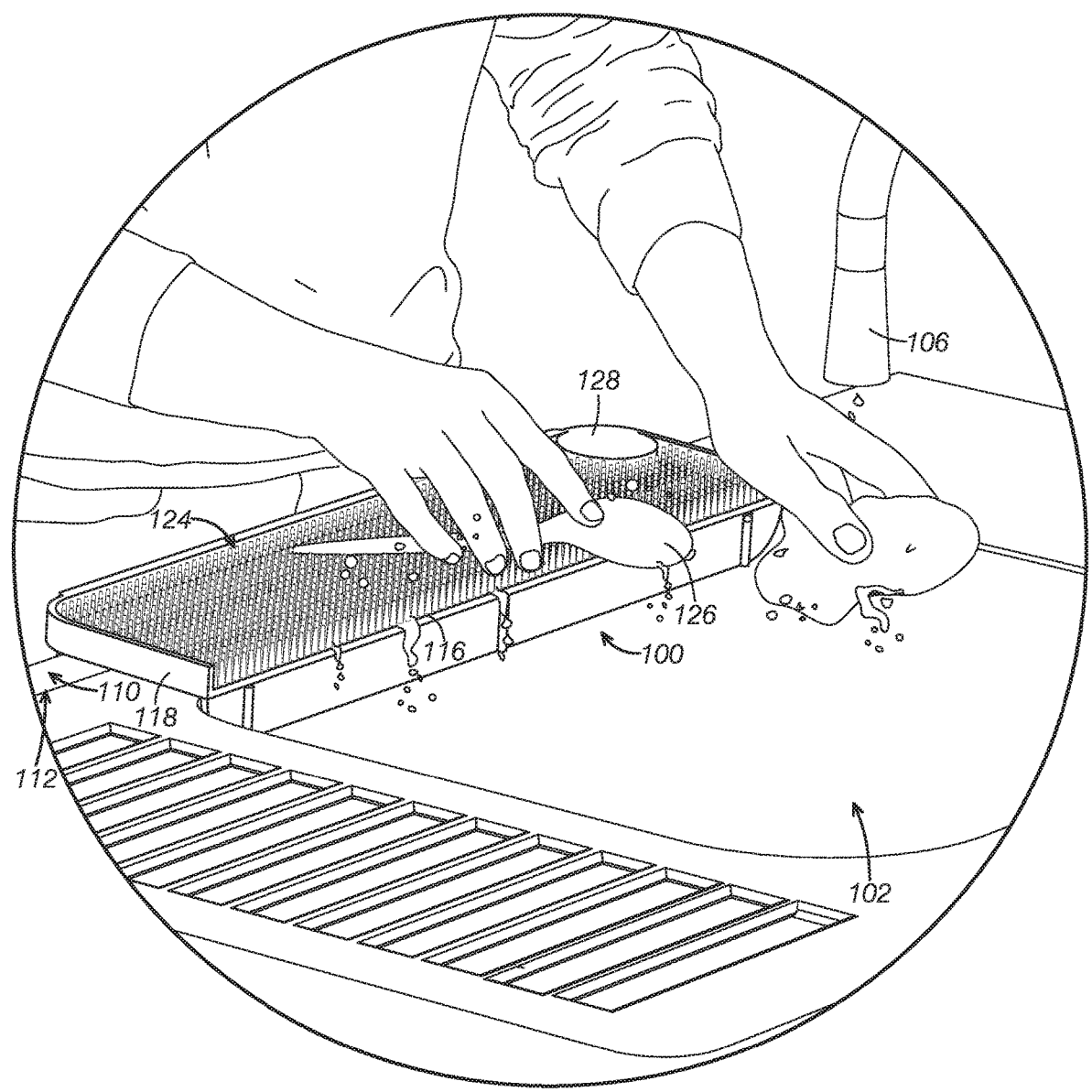
FIG. 1B illustrates the guard including protrusions extending upwardly from the substrate 116, according to an embodiment.

FIG. 1B illustrates the guard 100 including protrusions 124 extending upwardly from the substrate 116, according to an embodiment. Some of the features in FIG. 1B are the same or similar to some of the features in FIG. 1A as noted by same reference numbers, unless expressly described otherwise. As discussed above, the substrate 116 may be made of a material that may protect or shield the sink 102 and/or cabinet 108 from liquids, strikes, and other damage. The substrate 116 may also include the protrusions 124 extending upwardly from the substrate, relative to the lip 110 and the rim 112. In one example, the protrusions 124 may extend perpendicularly from the plane of the substrate 116. In one embodiment, the protrusions 124 may provide an abrasive surface for an individual to scrub an object 126. In one example, the object 126 may be silverware or dinnerware. In another example, the object 126 may be a pot, a pan, a pitcher, a container, or another object washed in the sink 102.

In one embodiment, the protrusions 124 may be bumps, lumps, knobs, hooks, filaments, and so forth that extend from the plane of the substrate 116. In another embodiment, the protrusions 124 may be a sponge or a sponge material, bristles, a foam, and so forth that cover at least a portion of a top surface of the substrate 116. In one example, the protrusions 124 may be made of flexible material, such as rubber or polyurethane, that may flex or bend as the object 126 is scrubbed against the protrusions 124. In another example, the protrusions 124 may be a stiff or inflexible material, such as a hard plastic or metal, that may not flex or bend as the object 126 is scrubbed against the protrusions 124. The protrusions 124 may aid a user as they wash objects in the sink 102 because the individual may not need to use a separate sponge or scrubbing device to remove particles from the object 126. Additionally, the protrusions 124 may be connected to the substrate 116 that is fixed to the sink 102 and/or cabinet 108 and remain stationary as the object 126 is scrubbed against the protrusions 124. In one embodiment, when the substrate 116 remains stationary and fixed, the protrusions may provide a fixed scrubbing surface for the user to scrub against while removing particles from the object 126 that may be difficult to remove using a conventional non-stationary scrubbing apparatus. In another embodiment, the protrusions may be removably connected to the substrate 116. For example, when the protrusions 124 are a sponge or a foam, the sponge or foam may be removed from the substrate 116 so that the sponge or foam may be used to further clean the object 126 and/or so that the individual may wash the sponge or foam.

In one embodiment, the protrusions 124 may extend across the entire top surface of the substrate 116 between the guard walls 118. In another embodiment, the protrusions 124 may extend across a first portion of the top surface of the substrate 116 and a second portion of the surface of the substrate 116 may not include the protrusions 124. For example, the substrate 116 may include an indicia portion 128 where indicia may be printed or inscribed onto the substrate 116. The indicia may include a logo, instructions, a disclaimer, and so forth.

In another embodiment, the first portion of the top surface of the substrate 116 may include protrusions 124 with a first shape and the second portion of the top surface of the substrate 116 may include protrusions with a second shape. For example, the protrusions 124 with the first shape may be bumps that extend from the top surface of the substrate 116 that a user may use to remove a first substance from the object 126 and the protrusions 128 with the second shape may be hooks that extend from the top surface of the substrate 116 that a user may use to remove a second substance. The differently shaped protrusions 124 may also be used by the user to scrub different types of objects or different shapes of objects against. In another embodiment, the differently shaped protrusions 124 may be intermixed across the surface of the substrate 116. The particles or substances removed from the object 126 may include food particles, oil, rust, biodegradable material, non-biodegradable material, and so forth.

Figure 1C:
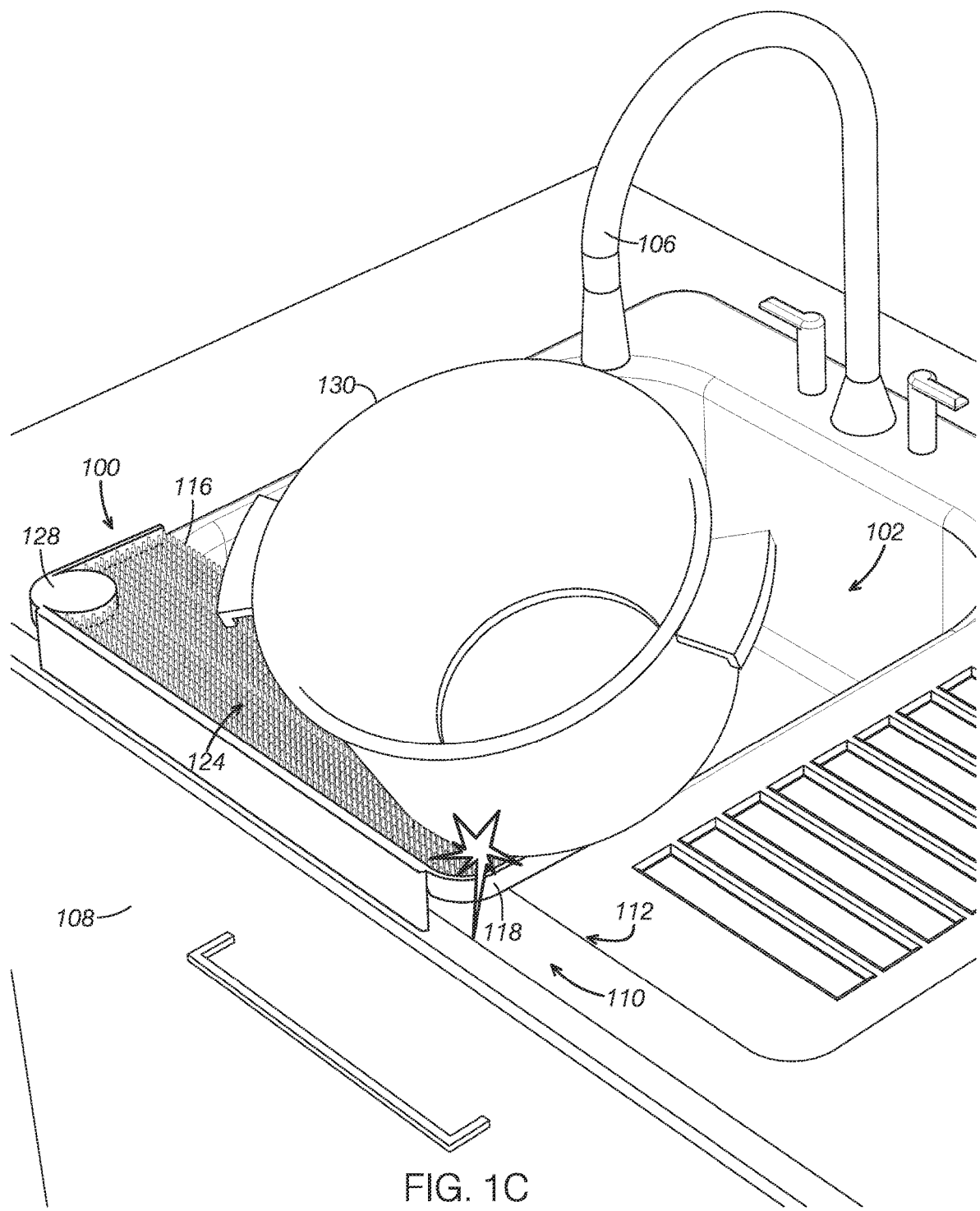
FIG. 1C illustrates the guard protecting the sink and cabinet from a strike by an object 130, according to an embodiment.

FIG. 1C illustrates the guard 100 protecting the sink 102 and cabinet 108 from a strike by an object 130, according to an embodiment. Some of the features in FIG. 1C are the same or similar to some of the features in FIGS. 1A-1B as noted by same reference numbers, unless expressly described otherwise. As discussed above, the guard 100 may be attached to a portion of the sink 102 and/or the cabinet 108.

When the guard 100 is attached to the sink 102 and/or cabinet 108, the guard may provide a protective buffer to shield the sink 102 and/or the cabinet 108 from being struck by the object 130. For example, the object 130 may be a dirty pot or pan that an individual is washing in the sink 102. As the individual washes the object 130, the individual may accidentally or carelessly strike the object 130 against the sink 102 and/or the cabinet 108. When the sink 102 and/or the cabinet 108 are unprotected, the strike may damage the sink 102 and/or the cabinet 108.

The guard 100 may protect the sink 102 and the cabinet 108 from the strike by providing a protective buffer between the object 130 and the sink 102 and/or the cabinet 108. When the individual is washing the object 130 and accidentally or carelessly moves to strike the object 130 against the sink 102 and/or cabinet 108, the guard 100 may absorb the force of the strike to protect the sink 102 and/or cabinet 108 from being damaged. In one example, to absorb the force of the strike, the guard 100 may be formed from a force-absorbing material that flexes and disperses the force across the guard.

The material may be rubber, plastic, polyurethane, and so forth. In another example, to absorb the force of the strike, the guard may have a minimal thickness so that the force is dispersed across the guard 100 and not through the guard 100 to the sink 102 and/or cabinet 108. In one embodiment, any part or portion of the guard 100 may be at least 6 millimeters (mm) thick. In another example, the protrusions 124 of the guard 100 may further absorb the force from the strike as the protrusions 124 may flex and bend as the object 130 strikes the protrusions.

FIGS. 1A-C illustrate a sink 102 with a single basin, however the single basin is not intended to be limiting. For example, the sink 102 may include two basins, where one of the basins may be for rinsing objects and the other basin is for washing the objects. In another example, the sink 102 may include multiple basins. The guard 100 may be attached to a sink 102 with a single basin or a sink with multiple basins. The size and shape of the sink 102 is not intended to be limiting. The size and shape of the sink 102 may vary based on a size or shape of the cabinet(s) 108, a configuration of a room where the sink 102 is located, and/or a personal preference of an individual desiring to use the sink.

Figure 2A:
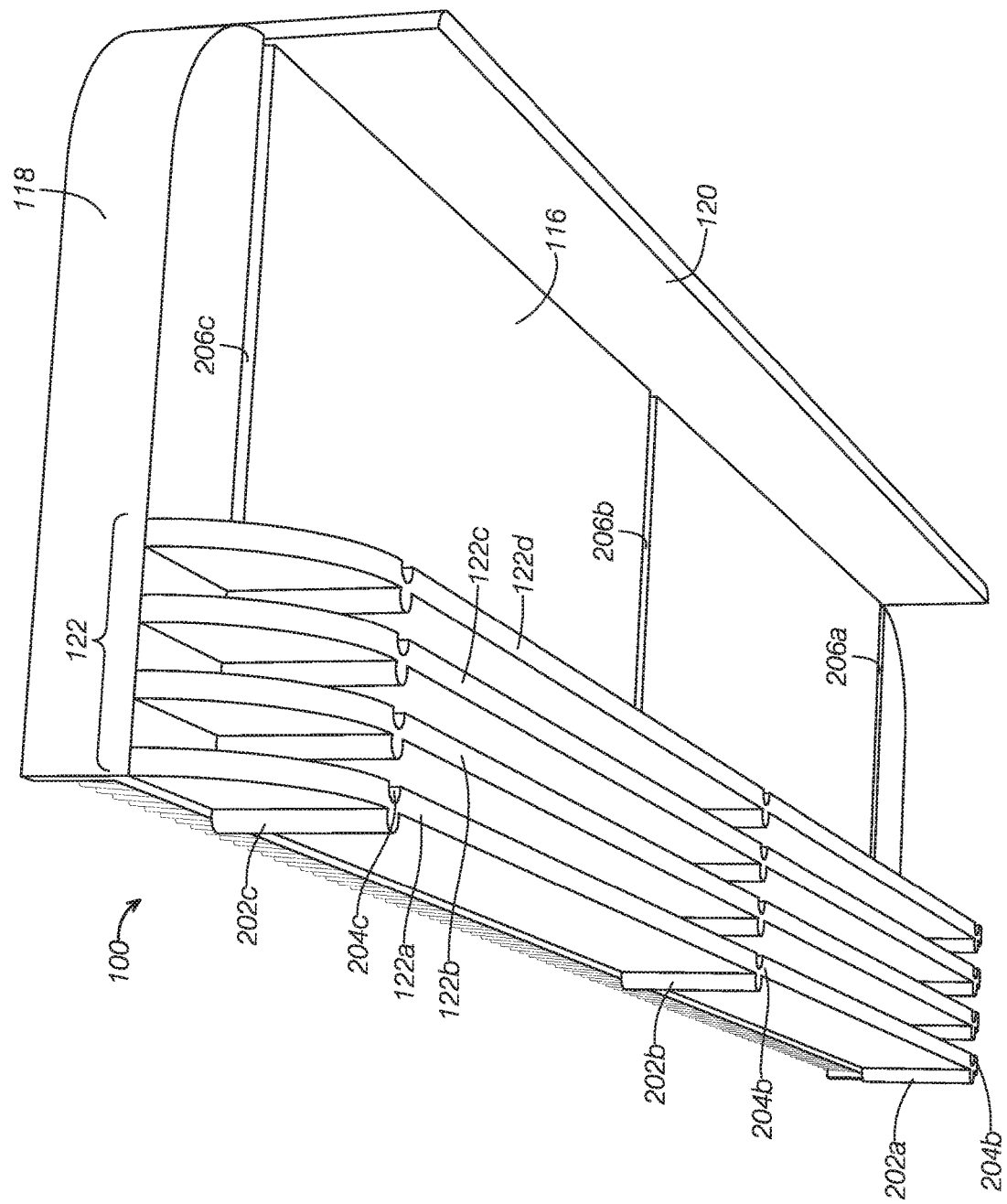
FIG. 2A illustrates a bottom perspective view of the guard, according to an embodiment.

FIG. 2A illustrates a bottom perspective view of the guard 100, according to an embodiment. Some of the features in FIG. 2A are the same or similar to some of the features in FIGS. 1A-1C as noted by same reference numbers, unless expressly described otherwise. As discussed above, when the guard 100 is attached to the lip 110 and/or rim 112, the back fastening wall 120 may hang over an outer edge of lip 110 of the cabinet 108 and the front fastening wall 122 may hang over an inner edge of the rim 112 in FIG. 1A.

As a width of the lip 110 and/or the rim 112 in FIG. 1A may vary, the front fastening wall may include multiple sub-walls 122a-d that may be adjusted to accommodate sinks 102 and cabinets 108 with various sizes of lips 110 and/or rims 112, respectively. Each of the sub-walls 122a-d may be spaced apart by a defined amount. In one example, the sub-walls 122a-d may be spaced apart by 5 mm. In another example, the sub-walls 122a-d may be spaced apart by 15 mm.

In one example, when the width of the lip 110 and/or the rim 112 is relatively small, such as approximately 25 mm, the sub-wall 122d may hang over the inner edge of the rim 112 while the back fastening wall 120 may hang over the outer edge of the lip 110. In another example, when the width of the lip 110 and/or the rim 112 is relatively large, such as approximately 50 mm in width, the sub-walls 122b-d may be removed from the substrate 116 and the sub-wall 122a may hang over the inner edge of the rim 112 while the back fastening wall 120 may hang over the outer edge of the lip 110. The number and spacing of the sub-walls 122a-d are not intended to be limiting. For example, the guard 100 may include a single sub-wall when the guard is not adjustable for the width of the lip 110 and/or the rim 112. In another example, the guard 100 may include multiple sub walls to increase or decrease an adjustability of the guard for the width of the lip 110 and/or the rim 112.

In one embodiment, an edge of one or more of the sub-walls 122a-d may be perforated along an edge attaching the sub-walls 122a-d to the substrate 116 so that an individual may tear one or more of the sub-walls 122a-d from the substrate 116. In another embodiment, the sub-walls 122a-d may be made of a material that may be cut by the individual to decrease the number of sub-walls 122a-d for a relatively wide lip 110 and/or rim 112.

In one embodiment, one or more of the sub-walls 122a-d may include protrusions 202a-c. In one example, the protrusions 202a-c may each be a bump or hump extending from the front surfaces of the sub-walls 122a-d and at least partially extending along a height or y-axis of the sub-walls 122a-d. In another embodiment, one or more of the sub-walls 122a-d may include grooves 204a-c. In one example, the grooves 204a-c may each be a channel or a depression extending into the back surfaces of the sub-walls 122a-d and at least partially extending along a height or y-axis of the sub-walls 122a-d.

In one embodiment, the spacing and location of the protrusions 202a-c along the front surface of the sub-walls 122a-d may correspond with the spacing and location of the grooves 204a-c along the back surface of the sub-walls 122a-d. For example, the spacing and location of protrusion 202a along the front surface may correspond with the spacing and location of groove 204a along the back surface, the spacing and location of protrusion 202b along the front surface may correspond with the spacing and location of groove 204b along the back surface, and the spacing and location of protrusion 202c along the front surface may correspond with the spacing and location of groove 204c along the back surface. The number, spacing, size, and location of protrusions 202a-c and/or grooves 204a-c is not intended to be limiting. For example, the sub-walls 122a-d may include a single protrusion or groove and/or multiple protrusions or grooves.

The substrate 116 may include grooves 206a-c. The grooves 206a-c may each be a channel or depression extending into the bottom surface of the substrate 116 and at least partially extending along a width or x-axis of the substrate 116. The number of grooves 206a-c is not intended to be limiting. For example, the substrate 116 may include a single groove or multiple grooves.

In one embodiment, the spacing and location of the protrusions 202a-c along the front surface of the sub-walls 122a-d may correspond with the spacing and location of the grooves 206a-c along the bottom surface of the substrate 116. For example, the spacing and location of protrusion 202a along the front surface of the sub-wall 122a may correspond with the spacing and location of groove 206a along the bottom surface of the substrate 116, the spacing and location of protrusion 202b along the front surface of the sub-wall 122a may correspond with the spacing and location of groove 206b along the bottom surface of the substrate 116, and the spacing and location of protrusion 202c along the front surface of the sub-wall 122a may correspond with the spacing and location of groove 206c along the bottom surface of the substrate 116. The number, spacing, size, and location of the grooves 206a-c are not intended to be limiting.

In another embodiment, one or more of the sub-walls 122a-d may be used to level a height of at least a portion of the substrate 116. For example, the lip 110 of the sink 102 and the rim 112 of the cabinet 108 in FIG. 1A may create an uneven surface for the guard 100 to rest on when the guard is attached to the sink 102 and/or cabinet 108.

In one example, to level the guard 100 so that the substrate 116 extends along a relatively flat and horizontal plane relative to the sink 102, one or more of the sub-walls 122a-d may be inserted below the substrate 116 to level or slope the substrate 116. In another example, to raise a height of a back portion of the substrate 116 above a height of the front portion of the substrate 116 so that the substrate 116 slopes downwardly toward the sink 102, one or more of the sub-walls 122a-d may be inserted below the substrate 116 to level or slope the substrate 116. The substrate 116 may be sloped downwardly so that liquids and other substances may be directed from the substrate 116 into the sink 102 by gravity. In one example, the downward slope may range from 1 degree to 15 degrees. In another example, the downward slope may range from 1 degree to 50 degrees.

In one embodiment, to level or slope the substrate 116, one of the sub-walls 122a-d (such as 122d) may be detached from the substrate 116. When any sub-wall 122a-c is detached from the substrate 116, any sub-wall 122a-c may be placed below the substrate 116 with the protrusions 202a-c being inserted into the corresponding grooves 206a-c.

When a single sub-wall 122a-d is insufficient to level or slope the substrate 116, multiple walls may be stacked beneath the substrate 116. For example, the first sub-wall 122a and the second sub-wall 122b may be removed from the substrate 116. Once removed, the protrusions 202a-c of the first sub-wall 122a may be inserted into grooves 206a-c and the protrusions 202a-c of the second sub-wall 122b may be inserted into grooves 202a-c of the first sub-wall 122a. The number of sub-walls used to level or slope the substrate 116 is not intended to be limiting. For example, a single sub-wall or multiple sub-walls may be used to level or slope the substrate 116.

Figure 2B:
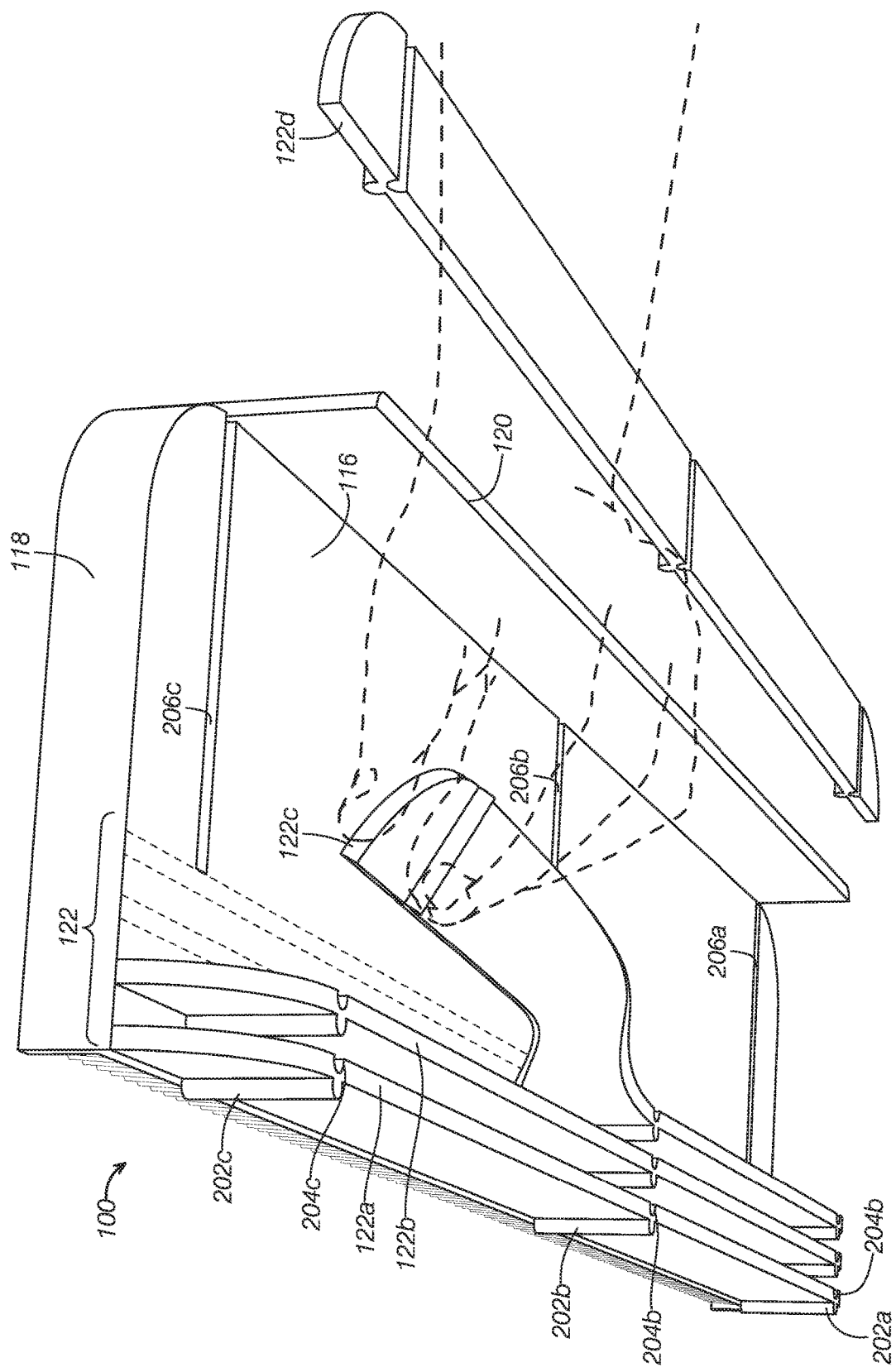
FIG. 2B illustrates the sub-walls being detached from the substrate of FIGS. 1A-2A, according to an embodiment.

FIG. 2B illustrates the sub-walls 122c-d being detached from the substrate 116 of FIGS. 1A-2A, according to an embodiment. Some of the features in FIG. 2B are the same or similar to some of the features in FIGS. 1A-2A as noted by same reference numbers, unless expressly described otherwise. As discussed above, the sub-walls 122c-d may be removed from the substrate 116 in a variety of ways. For example, an edge of the sub-walls 122c-d may be perforated along an edge attaching the sub-walls 122c-d to the substrate 116 so that an individual may tear the sub-walls 122c-d from the substrate 116. In another embodiment, the sub-walls 122c-d may be made of a material that may be cut by the individual to decrease the number of sub-wall 122c-d for a relatively wide lip 110 and/or rim 112. FIG. 2B shows the sub-wall 122d has been removed from the substrate 116 and the sub-wall 122c is in the process of being detached from the substrate 116.

Figure 2C:
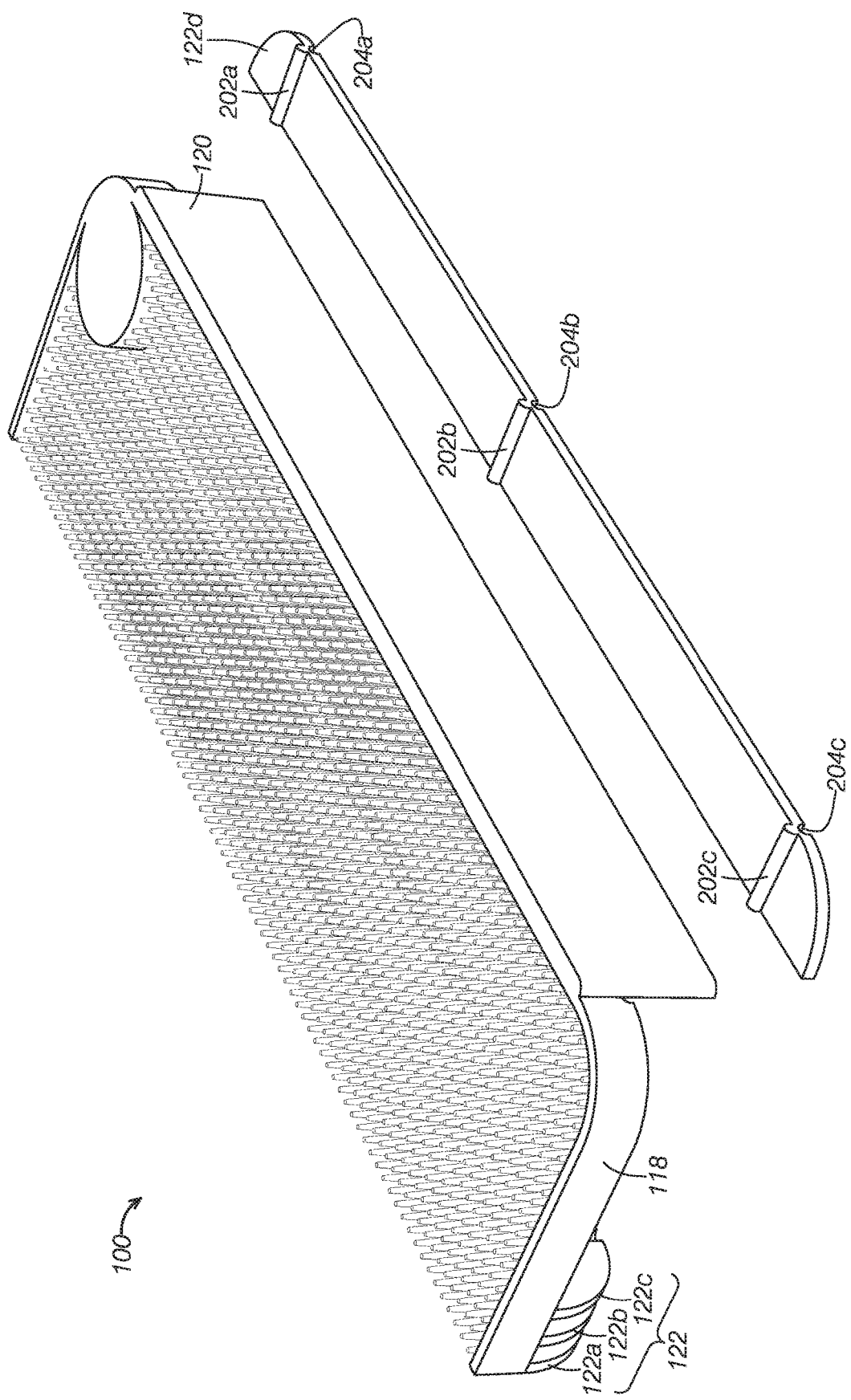
FIG. 2C illustrates the sub-wall being detached from the substrate of FIGS. 1A-2B, according to an embodiment.

FIG. 2C illustrates the sub-wall 122d being detached from the substrate 116 of FIGS. 1A-2B, according to an embodiment. Some of the features in FIG. 2C are the same or similar to some of the features in FIGS. 1A-2B as noted by same reference numbers, unless expressly described otherwise. As discussed above, the sub-wall 122a may be removed from the substrate 116. Once the sub-wall 122a has been detached from the substrate 116, the protrusions 202a-c of the sub-wall 122d may be inserted into the corresponding grooves 206a-c along the bottom surface of the substrate 116, as shown in FIG. 2A.

Figure 2D:
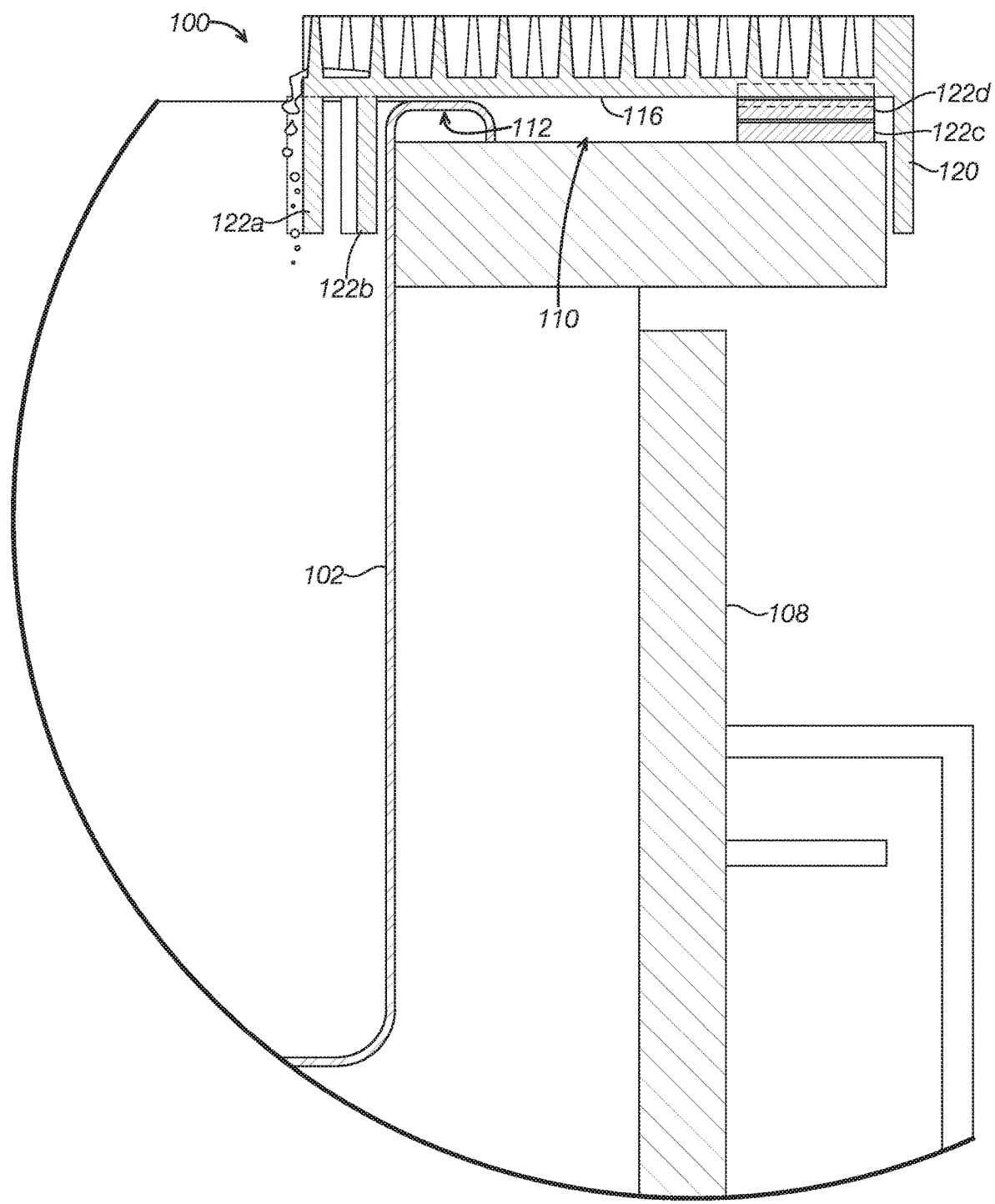
FIG. 2D illustrates the sub-walls leveling or sloping the substrate relative to the lip and the rim, according to an embodiment.

FIG. 2D illustrates the sub-walls 122c-d leveling or sloping the substrate 116 relative to the lip 110 and the rim 112, according to an embodiment. Some of the features in FIG. 2D are the same or similar to some of the features in FIGS. 1A-2C as noted by same reference numbers, unless expressly described otherwise. In one embodiment, the sub-walls 122c-d may be removed from the substrate 116 and be used to level a height of at least a portion of the substrate 116 relative to the lip 110 and the rim 112.

In one embodiment, the lip 110 of the sink 102 and the rim 112 of the cabinet 108 in FIG. 1A may create an uneven surface for the guard 100 to rest on when the guard is attached to the sink 102 and/or cabinet 108. For example, the lip 110 may extend to a height above a horizontal plane of the rim 112 when the sink 102 is installed to the cabinet 108.

In one embodiment, the sub-walls 122c and 122d may be inserted into the grooves 206a-c of FIG. 2A to level the guard 100 so that the substrate 116 extends along a relatively flat and horizontal plane relative to the lip 110 and the rim 112 so that the guard may retain substances splashed into the guard from the sink 102 or drain the substances back into the sink 102. For example, to level the substrate 116, the sub-walls 122c and 122d may be detached from the substrate 116. When the sub-walls 122c and 122d are detached from the substrate 116, the sub-wall 122d may be placed below the substrate 116 with the protrusions 202a-c of sub-wall 122d being inserted into the corresponding grooves 206a-c. In this example, the protrusions 202a-c of sub-wall 122c may be inserted into the corresponding grooves 204a-c of sub-wall 122c.

In another embodiment, when the user of the guard 100 desires the guard 100 to slope downwardly toward the sink 102 at a defined angle so that liquid or other substances may drain from the guard into the sink, the user may remove one or more additional sub-walls 122a and/or 122b. For example, when the user desires a slight downward slope of the guard 100 (such as a 1-15 degree downward angle), the user may detach the sub-wall 122a or 122b from the substrate 116. In one example, the user may detach sub-wall 122a and leave sub-wall 122b attached so that sub-wall 122b may be used to aid the guard in remaining connected to the sink 102 and cabinet 108 while having the sub-wall 122a available to slope the guard 100 downward. In this example, the protrusions 202a-c of sub-wall 122a may be inserted into the grooves 204a-c of sub-wall 122c to change the guard from being substantially level with the lip 110 and the rim 112 to sloping downwardly toward the cavity of the sink 102. The number of sub-walls used to level or slope the substrate 116 is not intended to be limiting. For example, a single sub-wall or multiple sub-walls may be used to level or slope the substrate 116.

The disclosure above encompasses multiple distinct embodiments with independent utility. While each of these embodiments has been disclosed in a particular form, the specific embodiments disclosed and illustrated above are not to be considered in a limiting sense as numerous variations are possible. The subject matter of the embodiments includes all novel and non-obvious combinations and sub-combinations of the various elements, features, functions and/or properties disclosed above and inherent to those skilled in the art pertaining to such embodiments. Where the disclosure or subsequently filed claims recites "an" element, "a first" element, or any such equivalent term, the disclosure or claims are to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. An apparatus, comprising:
a substrate extending horizontally along a plane, the substrate configured to attach to at least one of a sink or a cabinet, wherein the substrate comprises a top surface and a bottom surface;
a guard wall extending along at least part of a perimeter of the substrate, the guard wall extending upwardly from the plane, wherein:
the guard wall is configured to receive a substance from the sink; and
the substrate is configured to:
retain the substance or channel the substance into the sink; and
disperse the substance across at least a portion of the substrate;
a front fastening wall connected to a front edge of the substrate, the front fastening wall comprising:
a first sub-wall extending downwardly from the plane, wherein the first sub-wall extends at least partially along a length of the substrate; and
a second sub-wall extending downwardly from the plane, wherein the second sub-wall extends at least partially along the length of the substrate,
wherein at least one of the first sub-wall and the second sub-wall are removably attached to the substrate; and
a back fastening wall connected to a back edge of the substrate, the back fastening wall extending downwardly from the plane, wherein the front fastening wall and the back fastening wall are configured to conform around at least a portion of the sink or the cabinet.

2. The apparatus of claim 1, further comprising protrusions extending upwardly from the substrate.

3. The apparatus of claim 2, wherein the protrusions are configured to remove particles from an object.

4. The apparatus of claim 1, wherein the apparatus is at least one of a rubber material, a plastic material, or a polyurethane material.

5. The apparatus of claim 1, wherein the apparatus is a force absorbing material operable to disperse force from a strike by an object across at least a portion of the substrate.

6. The apparatus of claim 1, wherein the apparatus is configured to attach to a lip of the sink or a rim of the cabinet.

7. The apparatus of claim 1, wherein the substrate comprises a groove along the bottom surface of the substrate.

8. The apparatus of claim 7, wherein the groove at least partially extends along a width of the substrate.

9. The apparatus of claim 8, wherein the first sub-wall comprises a protrusion extending from a first surface of the first sub-wall, the protrusion is shaped to be inserted into a groove of the substrate, wherein when the protrusion of the first sub-wall is inserted into the groove of the first sub-wall it increases a height of at least a portion of the apparatus relative to the sink or cabinet.

10. The apparatus of claim 1, wherein the guard wall extends along a first side edge of the substrate, a second side edge of the substrate, and the back edge of the substrate.

11. A device, comprising:
a substrate extending along a plane, wherein the substrate comprises a top surface and a bottom surface;
a guard wall extending along at least part of a perimeter of the substrate, the guard wall extending upwardly from the plane;
a front fastening wall connected to a front edge of the substrate, the front fastening wall comprising:
a first sub-wall extending downwardly from the plane, wherein the first sub-wall extends at least partially along a length of the substrate; and
a second sub-wall extending downwardly from the plane, wherein the second sub-wall extends at least partially along the length of the substrate,
wherein the first sub-wall and the second sub-wall are removably attached to the substrate; and
a back fastening wall connected to a back edge of the substrate, the back fastening wall extending downwardly from the plane.

12. The device of claim 11, wherein the front fastening wall and the back fastening wall are configured to conform around at least a portion of a sink.

13. The device of claim 11, further comprising:
a first protrusion extending upwardly from the substrate; and
a second protrusion extending upwardly from the substrate.

14. The device of claim 13, wherein:
the first protrusion is a first type of protrusion; and
the second protrusion is a second type of protrusion.

15. The device of claim 11, wherein the first sub-wall comprises a protrusion extending from a first surface of the first sub-wall, the protrusion is shaped to be inserted into a groove extending along the bottom surface of the substrate, wherein when the first sub-wall is detached from the substrate the protrusion of first sub-wall is operable to be inserted into the groove to increase a height of at least a portion of the device.

16. The device of claim 11, wherein:
the first sub-wall is attached to the substrate with a first perforated edge to be removably connected to the substrate; and
the second sub-wall is attached to the substrate with a second perforated edge to be removably connected to the substrate.

17. An apparatus, comprising
a substrate extending along a plane, the substrate comprises:
a top surface defined by a plurality of outwardly extending protrusions that extend upwardly from the top surface of the substrate, wherein the outwardly extending protrusions are flexible such that a force caused by an object striking the top surface of the substrate is absorbed by the outwardly extending protrusions, and wherein the absorbed force is transferred across the substrate so that the striking object does not damage a covered portion of a sink or a cabinet that is underneath the apparatus; and
a bottom surface, wherein the bottom surface is disposed over a top surface of the covered portion of the sink or the cabinet;
a guard wall extending along at least first part of a perimeter of the substrate, wherein a fluid is retained within the top surface of the substrate by the guard wall, and wherein the fluid flows between the outwardly extending protrusions of the top surface of the substrate so that the fluid flows back into the sink via a second part of the perimeter of the substrate where the guard wall is absent;
a first fastening wall extending downwardly from a first edge of the substrate;
a second fastening wall extending downwardly from a second edge of the substrate, wherein the first fastening wall and the second fastening wall are configured to form a friction fit with at least the covered portion of the sink or the cabinet; and a sub-wall extending downwardly from the bottom surface of the substrate, wherein:
the sub-wall is removably attached to the substrate; and
the sub-wall comprises a protrusion operable to be inserted into a groove along the bottom surface of the substrate to adjust a height of the apparatus relative to the sink or the cabinet.

18. The apparatus of claim 17, wherein the plurality of outwardly extending protrusions comprises:
a first plurality of outwardly extending protrusions that are flexible such that the force caused by the object striking the top surface of the substrate is absorbed by the outwardly extending protrusions; and
a second plurality of outwardly extending protrusions that provide an abrasive surface portion to the top surface of the substrate,
wherein a user of the apparatus uses the second plurality of outwardly extending protrusions to scrub the object to remove particles from a surface of the object.

* * * * *